(12) United States Patent
Buehner et al.

(10) Patent No.: US 11,078,874 B2
(45) Date of Patent: Aug. 3, 2021

(54) VALVE FOR METERING A FLUID

(71) Applicant: Robert Bosch GmbH, Stuttgart (DE)

(72) Inventors: Martin Buehner, Backnang (DE);
Matthias Boee, Ludwigsburg (DE);
Nico Herrmann, Rastatt (DE); Stefan Cerny, Bietigheim-Bissingen (DE);
Tim Oliver Alheit, Magstadt (DE)

(73) Assignee: Robert Bosch GmbH, Stuttgart (DE)

(*) Notice: Subject to any disclaimer, the term of this patent is extended or adjusted under 35 U.S.C. 154(b) by 73 days.

(21) Appl. No.: 16/266,374

(22) Filed: Feb. 4, 2019

(65) Prior Publication Data

US 2019/0242346 A1    Aug. 8, 2019

(30) Foreign Application Priority Data

Feb. 8, 2018 (DE) .......................... 102018201951.7

(51) Int. Cl.
*F02M 51/06* (2006.01)
*F16K 31/06* (2006.01)

(52) U.S. Cl.
CPC ............................... *F02M 51/0625* (2013.01)

(58) Field of Classification Search
CPC ........... F02M 51/0635; F02M 51/0653; F02M 51/066; F16K 31/0686; F16K 31/0689; F16K 31/0696; F16K 47/02; F16K 47/023
USPC ...................................... 251/129.19, 129.16
See application file for complete search history.

(56) References Cited

U.S. PATENT DOCUMENTS

| | | | |
|---|---|---|---|
| 6,520,434 B1 * | 2/2003 | Reiter | F02M 51/0685 |
| | | | 239/585.5 |
| 9,518,542 B2 * | 12/2016 | Rogler | F02M 51/066 |
| 9,546,630 B2 * | 1/2017 | Maeurer | F02M 51/066 |
| 9,651,010 B2 * | 5/2017 | Kim | F02M 51/0685 |
| 9,932,948 B2 * | 4/2018 | Schaad | F16K 31/10 |
| 2002/0063173 A1 * | 5/2002 | Spakowski | F02M 61/168 |
| | | | 239/585.1 |
| 2003/0155440 A1 * | 8/2003 | Reiter | F02M 51/0685 |
| | | | 239/533.2 |

(Continued)

FOREIGN PATENT DOCUMENTS

| | | | | |
|---|---|---|---|---|
| DE | 102015217513 A1 | 3/2017 | | |
| DE | 102018200364 A1 * | 7/2019 | ......... | F02M 51/0685 |
| WO | WO-2014048609 A1 * | 4/2014 | ......... | F02M 51/0685 |

*Primary Examiner* — Seth W. Mackay-Smith
(74) *Attorney, Agent, or Firm* — Norton Rose Fulbright Us LLP; Gerard Messina

(57) ABSTRACT

A valve for metering fluids, for fuel injection valves for internal combustion engines, includes an electromagnetic actuator in a housing and a valve needle actuatable by an armature of the actuator, which actuates a valve closing body interacting with a valve-seat surface to form a sealing seat. The armature is movably guided on the valve needle. A stop element connected to the valve needle limits, with an actuation of the valve needle, a relative motion between the armature and the valve needle. The stop element includes at least one elastically deformable part and one stop piece, the elastically deformable part being shaped as a sleeve, and the stop element being configured so that the armature, upon the limitation of the relative motion between the armature and the valve needle, initially contacts the elastically deformable part and impacts the stop piece after a corresponding elastic deformation of the elastically deformable part.

9 Claims, 2 Drawing Sheets

(56) References Cited

U.S. PATENT DOCUMENTS

| | | | | |
|---|---|---|---|---|
| 2013/0221138 A1* | 8/2013 | Rogler | ................ | F02M 61/042 |
| | | | | 239/585.5 |
| 2014/0353409 A1* | 12/2014 | Kim | ..................... | F02M 61/20 |
| | | | | 239/585.5 |
| 2015/0240765 A1* | 8/2015 | Rogler | .............. | F02M 51/0675 |
| | | | | 239/585.5 |
| 2015/0247479 A1* | 9/2015 | Maeurer | ............. | F02M 51/066 |
| | | | | 239/585.2 |
| 2017/0030312 A1* | 2/2017 | Schaad | .............. | F16K 31/0696 |
| 2019/0010906 A1* | 1/2019 | Schaad | ............. | F02M 51/0685 |

\* cited by examiner

VALVE FOR METERING A FLUID

RELATED APPLICATION INFORMATION

The present application claims priority to and the benefit of German patent application no. 10 2018 201 951.7, which was filed in Germany on Feb. 8, 2018, the disclosure of which is incorporated herein by reference.

FIELD OF THE INVENTION

The present invention relates to a valve for metering a fluid, in particular, a fuel injection valve for internal combustion engines. Specifically, the present invention relates to the field of injectors for fuel injection systems of motor vehicles, in which a direct injection of fuel into combustion chambers of an internal combustion engine may take place.

BACKGROUND INFORMATION

Patent document DE 10 2015 217 513 A1 discusses a fuel injection valve which is utilized for fuel injection systems of internal combustion engines. The fuel injection valve includes a valve needle which interacts with a valve-seat surface to form a sealing seat, and an armature situated on the valve needle, which is acted upon by a return spring in a closing direction and interacts with a solenoid. The armature is mounted on the valve needle in an overhung manner between two stops in this case.

SUMMARY OF THE INVENTION

The valve according to the present invention having the features described herein has the advantage that an improved configuration and mode of operation, as well as a simple installation, are made possible. In particular, an advantageous damping of the armature during a closing process may be achieved.

Due to the measures described in the further descriptions herein, advantageous refinements of the valve described herein are possible.

In the case of the valve for metering the fluid, the armature (magnet armature) is not fixedly connected to the valve needle. Instead, the valve is mounted in an overhung manner between stops. At least one stop is formed by a provided stop element. The other stop may then be implemented in the form of a stop sleeve, a stop ring, or the like, if necessary, or may be formed on the valve needle. Via at least one spring, the armature in the resting state is displaced against a stop which is fixed relative to the valve needle, so that the armature rests against the stop. During the activation of the valve, the predefined armature free travel is then completely available as an acceleration distance. The stop, against which the armature rests in the resting state, may be implemented in the form of the provided stop element.

In the case of an armature situated on the valve needle in an overhung manner, the advantages, inter alia, result, as compared to a fixed connection of the armature to the valve needle or to a one-piece needle, that the valve needle may be reliably opened even under higher pressures, in particular, fuel pressures, due to the resultant impulse of the armature during opening, which may be referred to as dynamic mechanical amplification, and that a decoupling of the involved masses takes place, whereby the resultant impact forces on the valve-seat surface are divided between two impulses.

Specific problems result, however, which are associated with the overhung mounting of the armature on the valve needle. During the closing of the valve, after the armature impacts the stop close to the valve closing body, the armature rebounds. As a result, it may occur that the complete armature free travel is passed through once again and the armature still has so much energy upon the next impact, on the stop remote from the valve closing body, that the valve needle is briefly lifted off of its seat once again. As a result, inadvertent post-injections may occur, which result in increased pollutant emissions and increased fuel consumption. However, even when the armature does not pass through the complete armature free travel upon rebounding, the armature requires some time before it comes to rest again. If a re-activation takes place before the armature finally comes to rest, which is relevant in the event of multiple injections including short pause times between several injections, a valve function is no longer robust. It is therefore possible that the impact impulses become correspondingly more or less intense and, in the least favorable case, the valve no longer opens at all, since the impact impulse required therefor is no longer sufficiently great.

Due to the provided configuration, in which the stop element includes at least one elastically deformable part and one stop piece, it may be advantageously achieved that an armature rebound is prevented or at least substantially reduced. As a result, such specific problems as mentioned above may be solved. As a result, inter alia, a more robust multiple-injection capability in combination with short pause times may be achieved. In addition, less intense impact impulses upon closing may be achieved, which reduces the wear on the armature and on the stops as well as on the sealing seat. As a result, in addition, fewer function changes arise over the service life of the valve. Moreover, a noise reduction is also achieved as a result. Therefore, it may be advantageously achieved that a rebound height of the armature upon the closing of the valve, after the armature impacts the relevant stop, is reduced and the armature quickly reaches its rest position. Correspondingly, the functional capability may also be improved with respect to an opening of the valve. A rebound avoidance during an opening of a valve improves, for example, the injection behavior, since the opening takes place in a controlled and reproducible manner, and improves the closing movement, since the control signal is then decisive in this regard and a superimposition due to rebound movements does not take place.

The valve closing body, which is actuated by the valve needle, may be formed as one piece with the valve needle. The valve closing body may be configured as a spherical or conical valve closing body or even in another way.

Therefore, armature rebounds may be advantageously avoided by way of an increased damping of the armature movement. Depending on the configuration, the damping of the armature movement is possible, in this case, by way of a fluid damping or hydraulic damping and, if necessary, additionally by way of mechanical friction. As a result, a robust multiple-injection capability including short pause times may be ensured. As a result, impact impulses, in particular during the closing of the valve, may be reduced in intensity, which provides for reduced wear on the stop element. Moreover, a reduced function change over the service life results, since the contact surface of the armature and the stop surface of the stop element change very little over the service life due to the improved damping. Moreover, reduced noise emissions result.

The refinement having the features described herein has the advantage that an elastic deformability of the elastically deformable part may be advantageously achieved or at least assisted in a geometric way. In a configuration in which the stop piece is situated within the elastically deformable part, the advantage also results that a configuration may be implemented, in which an undesirable contact of the stop piece by the elastically deformable part during an actuation process is prevented. As a result, the elasticity of the elastically deformable part may be ensured during the limitation of the relative motion between the armature and the valve needle across the required range up to the impact of the armature on the stop piece.

The refinement having the features described herein has the advantage that an elastic deformation of the elastic deformable part may be achieved or assisted in a configuration-related way. In this case, in particular, a configuration is advantageous, in which the elastically deformable part is based, at least in some areas, on a hollow cone-shaped basic shape and the multiple slots are formed on this hollow cone-shaped basic shape.

The refinement as described herein has the advantage in this case that an advantageous yielding of the elastically deformable part is made possible during the limitation of the relative motion between the armature and the valve needle, in which case segments of the elastically deformable part separated by the slots spread radially outward relative to the longitudinal axis until the armature impacts the stop piece.

A liquid fluid provided in the armature chamber may be, in particular, the fluid which is metered by the valve. It is also possible, however, that the armature chamber is filled with a hydraulic fluid.

The refinements as further described herein have the advantage that a hydraulic movement damping may be implemented during the approach by the armature to the stop piece as well as during a subsequent movement of the armature away from the stop piece, i.e., during a rebound. In this case, the temporary overpressure in the damping chamber initially acts on the armature in a decelerating manner and, after the movement reversal, the temporary overpressure in the damping chamber acts counter to the movement of the armature away from the stop element. The hydraulic forces resulting on the armature therefore result in the armature coming to a rest in the armature chamber faster. In contrast to a hydraulic damping which is caused by the displacement of fluid in the armature chamber by the armature during its movement, the damping via the temporary overpressure and the temporary underpressure in the damping chamber acts only at the end of the movement of the armature, whereby the dynamics of the armature, in particular at the beginning of an actuation, are not adversely affected.

The hydraulic damping may be assisted by a friction damping. Friction may occur, in this case, between the front face of the armature and the contact surface of the elastically deformable part of the stop element when, for example, the individual segments of the elastically deformable part spread apart radially outward.

The refinement as further described herein has the advantage that a compact configuration of the stop element is made possible. Specifically, in the case of a configuration in which the elastically deformable part includes several segments which may spread apart outward, the advantage results that a stop piece situated within the elastically deformable part does not adversely affect this spreading apart.

The refinements as further described herein have the advantage that, in particular, a hydraulic adhesive effect at the beginning of an actuation may be prevented. Such a hydraulic adhesive effect could arise when the armature, in its starting position (rest position), rests against the stop surface of the stop piece. In particular, in the case of an armature chamber filled with a fluid, a delay then results at the beginning of the actuation, since fluid must initially flow into the gap forming upon the detachment of the armature from the stop surface. This is prevented by a certain distance of the armature from the stop surface, which is present in the starting position.

Exemplary embodiments of the present invention are explained in greater detail in the following description with reference to the attached drawings, in which identical elements are provided with identical reference numerals.

DETAILED DESCRIPTION

Figure 1:
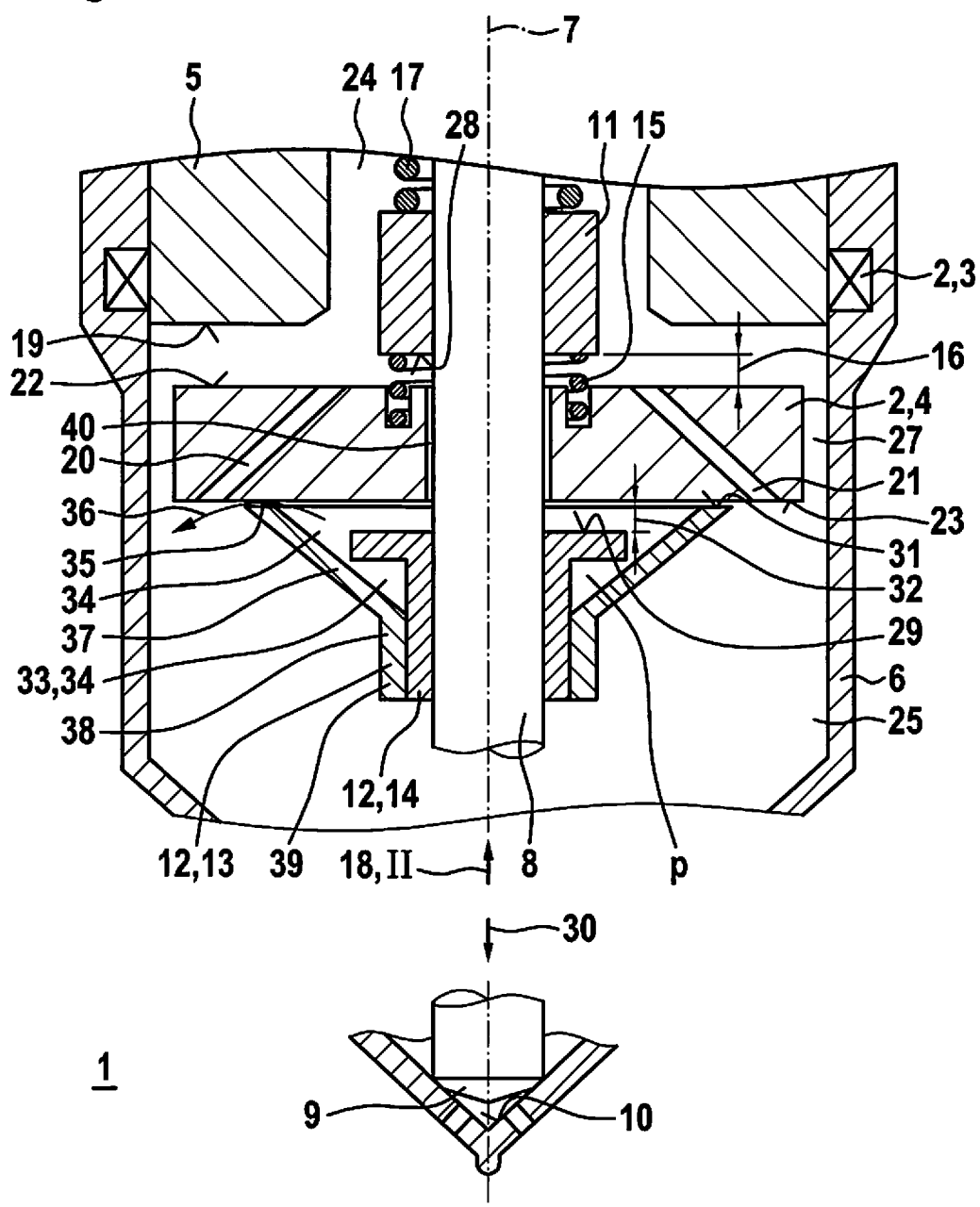
FIG. 1 shows a portion of a schematic sectional representation of a valve according to a first exemplary embodiment of the present invention.

FIG. 1 shows a portion of a schematic sectional representation of a valve 1 for metering a fluid according to a first exemplary embodiment. Valve 1 may be configured, in particular, as a fuel injection valve 1. An exemplary application is a fuel injection system, in which such fuel injection valves 1 are configured as high-pressure injection valves 1 and are utilized for the direct injection of fuel into assigned combustion chambers of the internal combustion engine. Liquid or gaseous fuels may be utilized as fuel in this case.

Valve 1 includes an actuator 2 which includes a solenoid 3 and an armature 4. By energizing solenoid 3, a magnetic circuit is closed via an internal pole 5, armature 4, and an at least partially magnetically conductive housing 6. Internal pole 5 is fixedly connected to housing 6. Valve 1 includes a valve needle 8 which is displaceable within housing 6 along a longitudinal axis 7; a valve closing body 9 is provided on valve needle 8. Valve closing body 9 interacts with a valve-seat surface 10 to form a sealing seat. Valve closing body 9 may be configured in the shape of a sphere or a partial sphere or in another shape. Moreover, valve closing body 9 may be configured as one piece with valve needle 8.

Stops 11, 12 are situated on valve needle 8 and are fixedly connected to valve needle 8. Stop 11 is formed by a stop sleeve. Stop 12 is configured as stop element 12 which includes an elastically deformable part 13 and a stop piece 14. Armature 4 is movable between stops 11, 12 and is guided on valve needle 8. In this regard, an armature free travel 16 is predefined in a starting position, in which spacer element 13 is relaxed, with the aid of an armature free travel spring 15. In a modified configuration, stop 11 may be additionally or alternatively configured in a manner corresponding to provided stop element 12, including an elastically deformable part and a stop piece.

In this exemplary embodiment, valve needle 8 is acted upon, via stop element 11, by a return spring 17 which acts upon valve closing body 9, with the aid of valve needle 8, against valve-seat surface 10. As a result, valve 1 is held closed in the resting state.

In order to actuate valve 1, solenoid 3 is energized, whereby armature 4 is actuated in an opening direction 18 along longitudinal axis 7 against the force of armature free travel spring 15. Return spring 17 initially holds valve needle 8 in its starting position in this case. Due to the acceleration of armature 4, upon impact on stop 11, a motion impulse is transmitted to valve needle 8, which results in the opening of valve needle 8. Thereupon, valve needle 8 is also accelerated. After armature 4 has impacted stop 19 of internal pole 5, valve needle 8 continues its movement in opening direction 18 due to its inertia, a movement reversal taking place due to the force of return spring 17. Thereafter, valve needle 8, during its movement counter to opening direction 18 and stop 11, impacts armature 4 once again, which, ideally, has been resting against internal pole 5 up to this point in time.

Armature 4 may include one or multiple through-holes 20, 21 which extend from a front face 22 of armature 4 to a front face 23 of armature 4. Due to an axial through-hole 24 formed at internal pole 5, the fluid, in particular, the fuel, is guided during operation to and then further through an armature chamber 25 to the sealing seat formed between valve closing body 9 and valve-seat surface 10. In this case, valve needle 8 may be guided in a suitable way along longitudinal axis 7 in housing 6. Through-holes 20, 21 enable a flow through armature 4, whereby an annular gap 27 between armature 4 and housing 6 may be reduced.

A stop element surface 28 is provided on stop element 11, which armature 4 impacts via its front face 22 during an actuation. A stop surface 29, facing front face 23 of armature 4, is formed on stop piece 14 of stop element 12. During a closing process, in which armature 4 is displaced in a closing direction 30 counter to opening direction 18, armature 4 initially contacts with its front face 23 a contact surface 31 of elastically deformable part 13. When armature 4 contacts contact surface 31 for the first time in this case, armature 4 is initially still remote from stop surface 29 of stop piece 14. This is illustrated by a distance 32 which, in a relaxed state of elastically deformable part 13, is predefined between contact surface 31 and stop surface 29, as viewed along longitudinal axis 7. During a further movement of armature 4 in closing direction 30, elastically deformable part 13 deforms, so that distance 32 decreases. When armature 4 impacts, with its front face 23, stop surface 29 of stop piece 14, a movement reversal takes place, in which armature 4 is displaced in opening direction 18 once again. During a deceleration process, a rebound on stop surface 29 may take place only one time and armature 4 quickly comes to rest. The armature 4, which has come to rest, then rests against contact surface 31 of elastically deformable part 13, a distance 32 to stop surface 29 being predefined once again. During a subsequent actuation of armature 4, complete armature free travel 16 is therefore available once again. Moreover, a hydraulic adhesive effect between front face 23 of armature 4 and stop surface 29 of stop piece 14 is prevented.

A liquid fluid, in particular, a liquid fuel, may be situated in armature chamber 25. As a result, an additional hydraulic damping may be achieved. When armature 4, during the closing process, rests against contact surface 31 for the first time, a damping chamber 34 having a volume 34' is enclosed in an interior space 33 of elastically deformable part 13. Due to shortening distance 32, an elastic deformation of elastically deformable part 13 takes place, whereby volume 34' of damping chamber 34 is reduced. As a result, a pressure p in damping chamber 34 increases. Therefore, an additional decelerating force counter to closing direction 30 onto armature 4 is required until armature 4 impacts stop surface 29 of stop piece 14. After the movement reversal, when armature 4 moves in opening direction 18 once again, a reduced pressure p in damping chamber 34 may therefore arise. Since an underpressure p now acts on front face 23 of armature 4, a resultant additional deceleration force counter to opening direction 18 therefore arises. Up to the point at which armature 4 comes to rest, additional deceleration forces acting counter to the movement direction may therefore be achieved with the aid of pressure p in enclosed damping chamber 34.

The displacement of liquid fluid from damping chamber 34 may take place via a gap 35 between contact surface 31 of elastically deformable part 13 and front face 23, as illustrated by an arrow 36. Moreover, a displacement of liquid fluid from damping chamber 34 may additionally or alternatively take place via a guide gap 40 between armature 4 and valve needle 8.

Elastically deformable part 13 is based, in some areas, on a hollow cone-shaped basic shape 37. In this case, hollow cone-shaped basic shape 37 is part of a sleeve 38. In this exemplary embodiment, elastically deformable part 13 is formed by sleeve 38 which is connected in a suitable way, at an annular section 39, to stop piece 14 and, therefore, valve needle 8. In this case, elastically deformable part 13 may also be elastically deformable only in the area of hollow cone-shaped basic shape 37, depending on the configuration. Hollow cone-shaped basic shape 37 expands radially, relative to longitudinal axis 7, toward front face 23 of armature 4. In particular, in the area of basic shape 37, the stiffness of elastically deformable part 13 is predefined to be so great that armature 4, in its starting position, rests against contact surface 31 and is spaced apart from stop surface 29 of stop piece 14.

Therefore, in this exemplary embodiment, the kinetic energy of armature 4 may be decreased across a longer path during a closing process. As a result, more energy may be dissipated, whereby a rebound of armature 4 is prevented or at least reduced.

Figure 2:
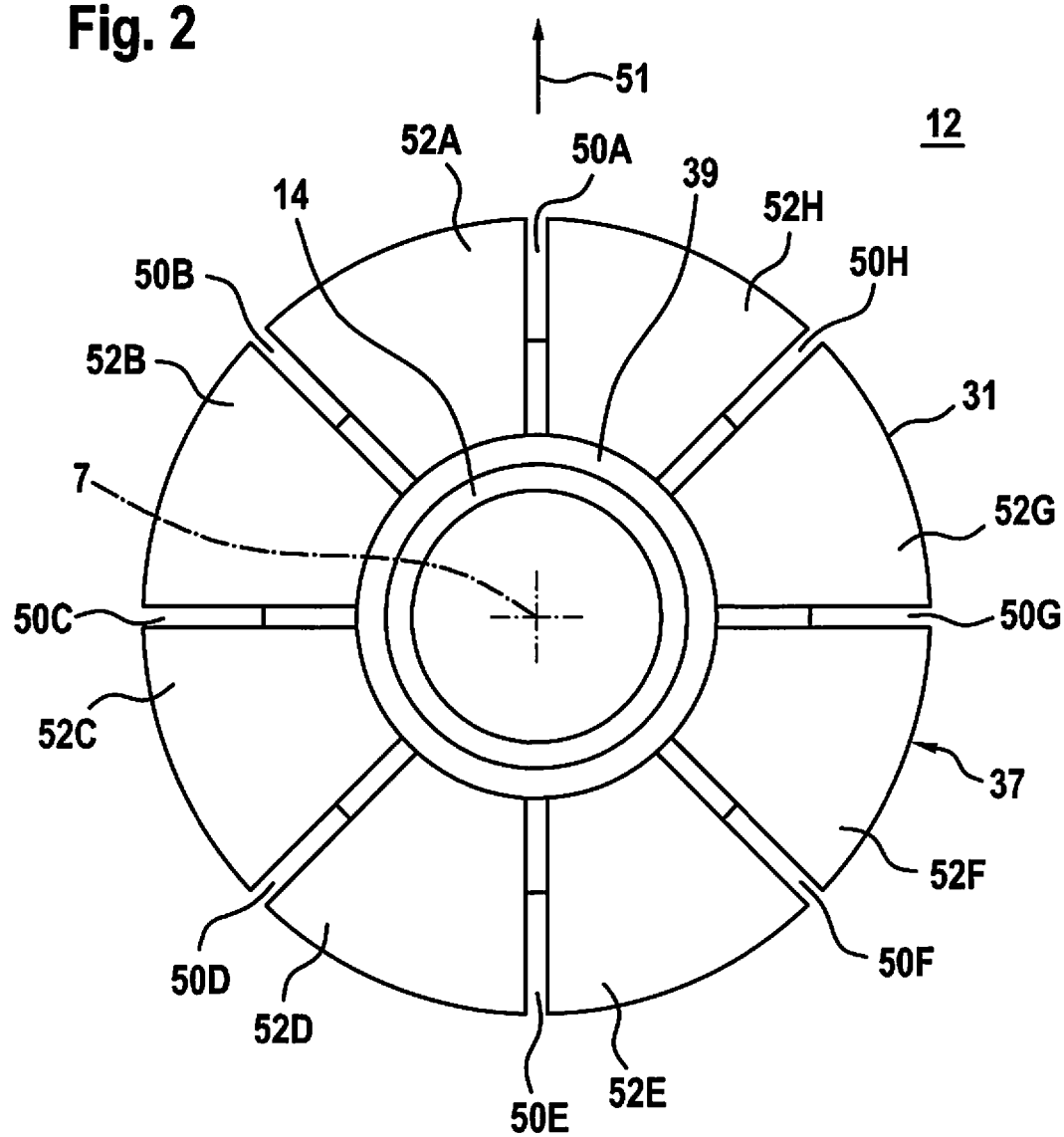
FIG. 2 shows a stop element of the valve shown in FIG. 1 in a portion of a schematic representation along the viewing direction labeled "II" according to a second exemplary embodiment of the present invention.

FIG. 2 shows a stop element 12 of valve 1 shown in FIG. 1 in a portion of a schematic representation along the viewing direction labeled "II" according to a second exemplary embodiment. In this exemplary embodiment, elastically deformable part 13 includes several slots 50A through 50H. In this exemplary embodiment, slots 50A through 50H are formed in hollow cone-shaped basic shape 37. In this case, slots 50A through 50H extend from contact surface 31 up to annular section 39 of elastically deformable part 13. Slots 50A through 50H extend in a projection, which extends along longitudinal axis 7 into a plane (the plane of the drawing in this case) oriented perpendicularly to longitudinal axis 7, as viewed at least essentially radially, a radial direction 51 being represented for slot 50A by way of example. Due to slots 50A through 50H, hollow cone-shaped basis shape 37 is divided into segments 52A through 52H. As a result, an elastic configuration of elastically deformable part 13 is made possible or further improved in a geometric way. Specifically, in this configuration, contact surface 31 extending across segments 52A through 52H moves radially outward relative to longitudinal axis 7 when distance 32 shortens upon the limitation of the relative motion between armature 4 and valve needle 8. In this case, the segmented, hollow cone-shaped basic shape 37 basically spreads apart.

Slots 50A through 50H may be configured so that, upon the limitation of the relative motion between armature 4 and valve needle 8, pressure p in volume 34' of damping chamber 34 increases at least intermittently, in particular, after the first contact of contact surface 31 of elastically deformable part 13 by armature 4.

Due to the radial movement of contact surface 31, a friction between contact surface 31 of elastically deformable part 13 and front face 23 is also made possible. Due to the friction, an additional damping arises.

The present invention is not limited to the described exemplary embodiments.

What is claimed is:

1. A valve for metering a fluid, which is a fuel injection valve for an internal combustion engine, comprising:
   an electromagnetic actuator situated in a housing;
   a valve needle actuatable by an armature of the electromagnetic actuator, for actuating a valve closing body which interacts with a valve-seat surface to form a sealing seat, the armature being movably guided on the valve needle; and
   at least one stop element connected to the valve needle, which, in connection with an actuation of the valve needle, limits a relative motion between the armature and the valve needle;
   wherein the stop element includes at least one elastically deformable part and one stop piece, wherein the elastically deformable part is configured at least partially in the form of a sleeve, and wherein the stop element is configured so that the armature, upon the limitation of the relative motion between the armature and the valve needle, initially contacts the elastically deformable part and impacts the stop piece only after a corresponding elastic deformation of the elastically deformable part,
   wherein the elastically deformable part includes multiple slots which divide the elastically deformable part into segments and which are open on a contact surface of the elastically deformable part and which extend from the contact surface up to an annular section of the elastically deformable part, at which the armature initially contacts the elastically deformable part upon the limitation of the relative motion between the armature and the valve needle, wherein a pair of adjacent sides of a pair of neighboring ones of the segments are parallel,
   wherein the contact surface moves radially outward relative to a longitudinal axis of the valve needle when a distance predefined between the contact surface and a stop surface of the stop piece shortens upon the limitation of the relative motion between the armature and the valve needle.

2. The valve of claim 1, wherein the elastically deformable part is based, at least in some areas, on a hollow cone-shaped basic shape as viewed along the longitudinal axis of the valve needle, and wherein the hollow cone-shaped basic shape radially expands, relative to the longitudinal axis, toward a front face of the armature facing the stop element.

3. The valve of claim 1, wherein the slots extend in a projection, which extends along the longitudinal axis of the valve needle into a plane oriented perpendicularly to the longitudinal axis, as viewed at least essentially radially.

4. The valve of claim 1, wherein, upon the limitation of the relative motion between the armature and the valve needle, a damping chamber limited by a front face of the armature is formed within the elastically deformable part, and, upon the limitation of the relative motion between the armature and the valve needle at the stop element, a volume of the damping chamber is reduced.

5. The valve of claim 4, wherein the elastically deformable part includes multiple slots and the slots are configured so that, upon the limitation of the relative motion between the armature and the valve needle at the stop element, a pressure in the volume of the damping chamber at least intermittently increases.

6. The valve of claim 1, wherein the stop piece is situated within the elastically deformable part.

7. The valve of claim 1, wherein the stop element is configured so that the armature, in a starting position, rests against the elastically deformable part and is spaced apart from the stop surface of the stop piece.

8. The valve of claim 1, wherein a stiffness of the elastically deformable part is predefined to be such that the armature, in a starting position, rests against the elastically deformable part and is spaced apart from the stop surface of the stop piece.

9. The valve of claim 1, wherein a contact surface of the elastically deformable part, at which the armature initially contacts the elastically deformable part upon the limitation of the relative motion between the armature and the valve needle, is situated, viewed along the longitudinal axis of the valve needle, closer to a front face of the armature, facing the stop element, than the stop surface formed on the stop piece.

* * * * *